(12) United States Patent
Huenefeld (10) Patent No.: US 12,135,006 B2
(45) Date of Patent: Nov. 5, 2024

(54) DUAL ROTOR LOW SPEED WIND TURBINE HAVING TWISTED BLADES

(71) Applicant: John S. Huenefeld, Marysville, WA (US)

(72) Inventor: John S. Huenefeld, Marysville, WA (US)

( * ) Notice: Subject to any disclaimer, the term of this patent is extended or adjusted under 35 U.S.C. 154(b) by 25 days.

(21) Appl. No.: 17/864,812

(22) Filed: Jul. 14, 2022

(65) Prior Publication Data

US 2023/0019119 A1 Jan. 19, 2023

Related U.S. Application Data

(60) Provisional application No. 63/222,232, filed on Jul. 15, 2021.

(51) Int. Cl.
*F03D 1/02* (2006.01)
*F03D 9/25* (2016.01)
*F03D 15/00* (2016.01)
*H02K 7/18* (2006.01)

(52) U.S. Cl.
CPC .............. *F03D 1/02* (2013.01); *F03D 9/25* (2016.05); *F03D 15/00* (2016.05); *H02K 7/183* (2013.01); *F05D 2220/76* (2013.01)

(58) Field of Classification Search
CPC ........ F03D 1/02; F03D 1/0608; F03D 1/0625; F03D 1/0633; F03D 1/0641; F03D 1/0642; F03D 1/0643; F03D 1/0645; F03D 1/0647; F03D 1/0648; F03D 1/0649; F03D 1/065; F03D 1/0675; F03D 5/00; F03D 5/005; F05B 2250/232; F05B 2260/4031; F05D 2220/76; H02K 7/183; Y02E 10/72

USPC .... 290/44, 55; 416/120, 123, 128, 156, 176, 416/223 R–243

See application file for complete search history.

(56) References Cited

U.S. PATENT DOCUMENTS

| | | | |
|---|---|---|---|
| 436,595 A | | 9/1890 | Collins et al. |
| 1,025,929 A | * | 5/1912 | Snook .................... F03B 13/182 |
| | | | 416/63 |
| 1,729,362 A | * | 9/1929 | Ruthven ................. F03B 17/06 |
| | | | 416/11 |
| 1,745,356 A | * | 2/1930 | Crofton ................. F03B 17/063 |
| | | | 416/123 |
| 4,161,370 A | | 7/1979 | Oppolzer |
| 4,500,259 A | | 2/1985 | Schumacher |
| 4,606,697 A | * | 8/1986 | Appel ....................... F03D 3/02 |
| | | | 415/60 |

(Continued)

FOREIGN PATENT DOCUMENTS

| | | |
|---|---|---|
| CA | 2172294 A1 | 9/1997 |
| CN | 210106065 U | 2/2020 |

(Continued)

*Primary Examiner* — Tulsidas C Patel
*Assistant Examiner* — S. Mikailoff
(74) *Attorney, Agent, or Firm* — Miller Nash LLP (57) ABSTRACT

A wind turbine includes a frame having a generally elongated shape, the frame having a first rotor support and a second rotor support, a rotor rotatably mounted to the frame between the first rotor support and the second rotor report, that, when mounted, a centerline of the rotor mounted has an angle relative to horizontal between approximately 30 and 60 degrees, and at least one blade coupled to the rotor.

8 Claims, 12 Drawing Sheets

(56) References Cited

U.S. PATENT DOCUMENTS

| | | | | |
|---|---|---|---|---|
| 5,495,128 | A | * | 2/1996 | Brammeier ............... F03D 9/25 |
| | | | | 290/55 |
| 5,969,430 | A | | 10/1999 | Forrey |
| 7,094,017 | B2 | | 8/2006 | Kurita |
| 7,344,353 | B2 | | 3/2008 | Naskali et al. |
| 8,536,720 | B2 | | 9/2013 | Bates et al. |
| 8,946,923 | B2 | | 2/2015 | Steel |
| 9,534,582 | B2 | | 1/2017 | Prieto |
| 2009/0146432 | A1 | | 6/2009 | Ballena |
| 2013/0094967 | A1 | * | 4/2013 | Su ........................... F03D 9/25 |
| | | | | 416/202 |

FOREIGN PATENT DOCUMENTS

| | | |
|---|---|---|
| CN | 111425345 A | 7/2020 |
| CN | 112377367 B | 12/2021 |
| DE | 2758447 A1 | 7/1979 |
| DE | 2819673 A1 | 11/1979 |
| DE | 102015112371 A1 | 2/2017 |
| EP | 64440 A2 | 11/1982 |
| FR | 2449208 A1 | 9/1980 |
| FR | 2973843 B1 | 4/2013 |
| JP | S59190482 A | 10/1984 |
| KR | 1020140102459 A | 8/2014 |
| WO | 2007017930 A1 | 2/2007 |
| WO | 2009016372 A2 | 2/2009 |
| WO | 2009016372 A3 | 7/2009 |
| WO | 2011044130 A1 | 4/2011 |

\* cited by examiner

DUAL ROTOR LOW SPEED WIND TURBINE HAVING TWISTED BLADES

CROSS-REFERENCE TO RELATED APPLICATIONS

This application is a non-provisional of, and claims benefit from, U.S. provisional patent application No. 63/222,232, titled "ARRANGEMENT FOR A DUAL ROTOR LOW SPEED WIND TURBINE," filed Jul. 15, 2021, the disclosure of which is incorporated herein by reference in its entirety.

FIELD OF THE INVENTION

This disclosure is related to wind turbines, and, more particularly to an arrangement for a dual-rotor wind turbine that generates significant power at low speeds.

BACKGROUND

The majority of large and small scale wind turbines employ a three-bladed design that resembles an airplane propeller or a fan with relatively narrow blades. These traditional designs use long, thin airfoils that rotate about a central axis when wind flows over the airfoils.

There are several drawbacks with these traditional wind turbines. Among other problems, even on a small scale, these wind turbines have high blade tip velocities, due to the relatively large circumferential path the blade tips follow while rotating. This high tip speed creates noise in the form of audible and subsonic vibrations, and also makes the spinning blades dangerous to wildlife. Also, to achieve the necessary stiffness in the thin blades, carbon fibers are included in the material, making the blades difficult to recycle or dispose of at the end of their useful life. Further, these conventional designs can operate only in a limited range of wind velocities and must be shut down in high winds. These designs also suffer from inefficiency in low winds, making power production unpredictable, especially in areas without relatively strong prevailing winds.

Embodiments according to this disclosure address these and other shortcomings of conventional turbine blade design.

DESCRIPTION

Embodiments according to the disclosure include a wind turbine that uses two counter-rotating rotors to effectively and efficiently capture wind energy and convert it to rotational energy.

Figure 1:
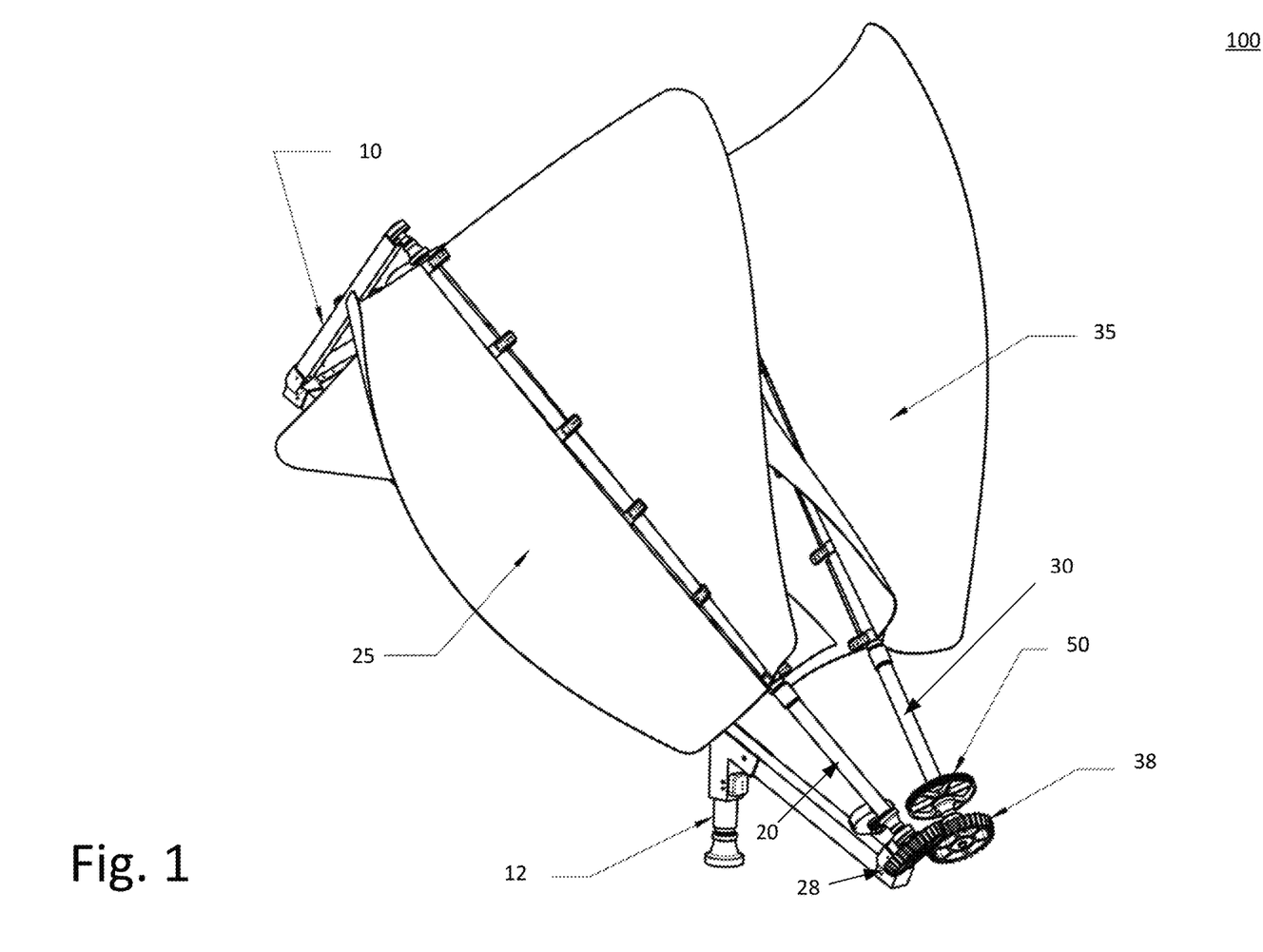
FIG. 1 is a front, right, isometric line drawing that illustrates a dual-rotor wind turbine according to embodiments of the disclosure.

FIG. 1 is an isometric drawing providing a perspective view of a wind turbine 100 according to embodiments of the disclosure. Main components of the illustrated wind turbine 100 include a frame 10, a left axel 20, a right axel 30, left and right blades or sails 25, 35, a set of bevel gears 28, 38, and, optionally, a drive pulley 50 for harnessing power from the wind turbine. The frame 10 is durable and rigid, and it is preferably formed from metal, such as aluminum or steel. The frame 10 may be coated or treated to withstand the elements. In other embodiments, the frame 10 may be formed from other rigid, strong, materials, such as plastic, fiberglass, or carbon fiber.

The axels 20, 30 include bearings or other structures at both ends that allow the axels to rotate while being securely mounted to the frame 10. Each axel has mounted thereon a structure that creates lift when exposed to the wind. The structure may be referred to herein as a wing, sail, or blade. Specifically, blade 25 is mounted or affixed to axel 20, and blade 35 is mounted or affixed to axel 30. Although blades 25, 35 are referred to in the singular, multiple physical blades may be mounted to their respective axels 20, 30, and reference to the blades will refer to the entire number of blades in the set of blades unless specifically described as referring to a singular blade. Although not separately numbered in FIG. 1, the combination of an axel and its attached blade, or set of blades, is referred to herein as a rotor.

The blades 25, 35 of FIG. 1 are shaped and configured so that, when facing the wind, the left axel 20 rotates counter-clockwise while the right axel 30 rotates clockwise. The axels 20, 30 are mechanically coupled to one another through the set of bevel gears 28, 38, which are each fixed to a respective axel and are intermeshed with one another. The bevel gear 28 is fixed to the left axel 20, while the bevel gear 38 is fixed to the right axle 30. Thus, when one of the axels 20, 30 spins in a first direction, the other of the axels spins in the opposite direction.

By incorporating dual, counter-rotating, rotors, gyroscopic forces in the system are cancelled out within the wind turbine system. Also, the frame 10 includes a swivel 12 mounted to the underside of the frame. This swivel 12 allows the frame 10, and therefore the entire wind turbine 100, to swivel, or rotate, as the wind direction changes. In other words, the swivel 12 is fixed at a bottom portion and further includes a rotating portion that rotates about a long axis of the swivel. The base of the swivel 12 may be attached to a tall pole or tower to place the wind turbine 100 in a clear, non-turbulent airstream. Then, as the wind direction changes, the entire wind turbine 100 rotates so that the blades continue facing the wind. If the wind direction changes, force on one of the rotors increases while the other decreases, and the swivel 12 rotates the wind turbine 100 to compensate and again be faced toward the wind. The swivel 12 allows the wind turbine 100 to rotate as the prevailing wind changes direction without concern for induced stresses to the any single component of the wind turbine. Also, unlike other wind-generating devices, the wind turbine 100 does not necessarily need any type of wind rudder, or other device to cause it to rotate about the swivel 12 as the direction of the wind changes, as the arrangement of the blades 25, 35, and axels, 20, 30 about the frame 10 allows the wind turbine 100 to rotate based on the various wind forces exerted on the wind turbine as the wind blows.

Although many variations exist, as described below, the axels 20, 30, are angled from a horizontal plane that is perpendicular to the long axis of the swivel 12. Also as described below, in some embodiments the axels 20, 30 are angled away from one another, so that the portions of the axels nearest the set of bevel gears 28, 38 are nearer to one another than the portions near the opposite end. This angled orientation of the axels 20, 30 provides adequate room for the asymmetrical sail-shaped blades 25, 35 to operate without striking the opposite rotor. This feature is described in more detail below.

Due to the configuration of the wind turbine 100, and especially the rotors, each rotor experiences a drag-powered down stroke when the blades are on the outside of a rotation, and a lift powered upstroke while the blades are on the inside. The rotors are kept in synchronization by the set of bevel gears 28, 38, which are fixed to the axels 20, 30 of the rotors.

Electricity may be generated from the wind turbine 100 by drawing power from either or both of the rotors and converting their rotational power to electrical power through a generator, alternator, or other electricity producing device. More specifically, the drive pulley 50, which may be coupled to either or both of the axels 20, 30 may be coupled through additional gearing or one or more belts to a turning shaft of a generator. In some embodiments, additional gearing or pulleys of various sizes may be used to increase or decrease the ultimate rotational speed of the generator. For example, the drive pulley 50 could be directly or indirectly coupled to a load pulley (not illustrated) having a smaller diameter than the drive pulley, which would provide an increased rotational speed of the load pulley. Or, the drive pulley 50 could be directly or indirectly coupled to a load pulley having a larger diameter than the drive pulley, which would decrease the speed, but provide additional power, to the load pulley. In some embodiments, multiple pulleys or gears could be used to match the rotational speed of the rotors to the desired rotational speed of the device being driven. In other embodiments, power from the axels 20, 30 may be used to perform other work, such as driving a water or other hydraulic pump, or generating energy that can be stored for later use. In some embodiments, the wind turbine 100 operates, i.e, the rotors spin, at less than 500 r.p.m, in winds up to 50 m.p.h., and preferably between 100-200 r.p.m.

Figure 2:
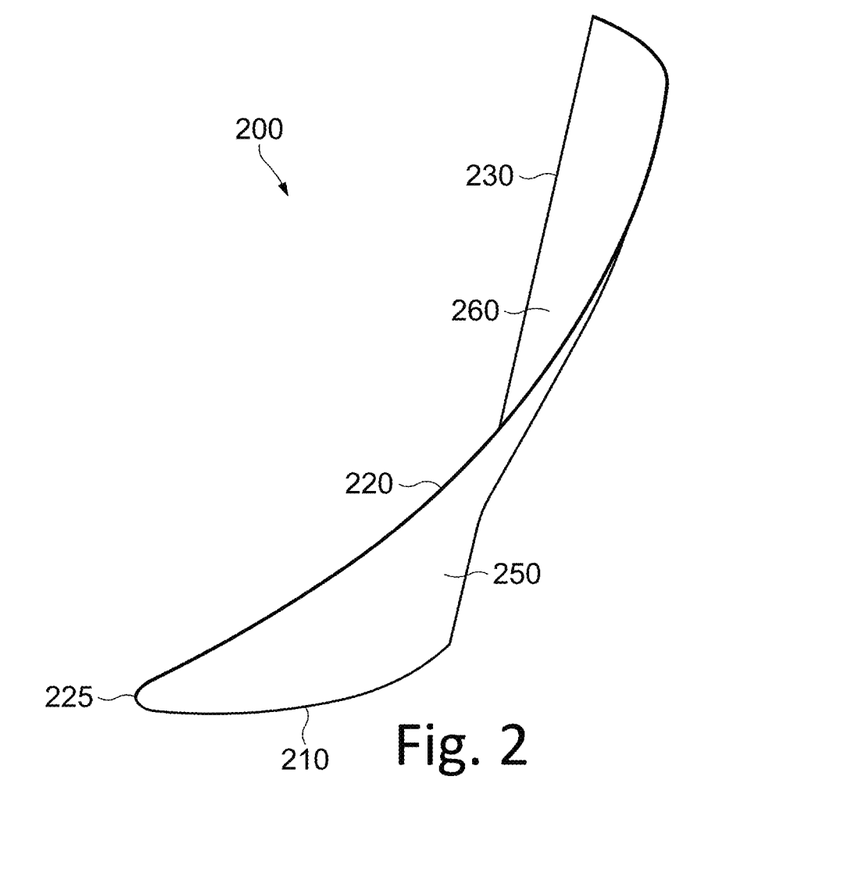
FIG. 2 is an isometric view of a wind turbine blade that may be used in the dual-rotor wind turbine of FIG. 1, according to embodiments of the disclosure.

FIG. 2 is an isometric line drawing that illustrates a blade 200, which may be an example of one of the blades 25, 35 described with reference to FIG. 1. As illustrated in FIG. 2, the blade 200 generally forms the shape of a truncated triangle, and includes an amount of twist, rather than being planar. The twist provides a three-dimensional shape that allows the blade 200 to generate lift from wind flowing across the blade 200, which is converted to rotational energy as described below.

In general, the blade 200 includes a trailing edge 210, a long or leading edge 220, and a vertical edge 230. As described above, the blade 200 includes a degree of twist, as measured from a reference of the vertical edge 230, had the blade 200 been mounted in a planar fashion, to a corner 225 on the blade 200, where the trailing edge 210 meets the leading edge 220. For easier reference, the surface of the blade 200 away from the twist is referred to as an outside surface 250 of the blade, while the surface of the blade on the inside of the twist is referred to as an inside surface 260. The amount, or degree, of twist of the blade 200 influences how it interacts with the wind. If there is too little twist, the blade 200 will generate less power than it is capable of, while, if there is too much twist, the wind will spill off the outside surface 250 and reduce the amount of lift generated by the blade 200. In some embodiments, the amount of twist of the blade 200 is set between 40-120 degrees, preferably between 70-100 degrees, and most preferably at or about 90 degrees.

The relative sizes of the trailing edge 210, leading edge 220, and vertical edge 230 control the taper and shape of the blade 200. The taper of the blade 200, i.e., the general angle between the vertical edge 230 and leading edge 220, may be selected in conjunction with choosing an angle of separation of the axels 20, 30 (FIG. 1) so that the leading edge 220 of each blade 200 does not interfere with the opposite axle nor any blades coupled to the opposite axle. For example, with reference to FIG. 1, if the trailing edge of the blade 25 (which is the uppermost edge as illustrated in FIG. 1) were significantly larger, then the blade 25 would interfere with the axle 30 of the opposite rotor. And, if the blade 200 has too much twist, then the blade 200 would interfere with a blade of the opposite rotor.

In one embodiment, the vertical edge 230 has a height of 175 cm, the leading edge 220 has a length of 218 cm, and the trailing edge 210 has a length of 110 cm. In another embodiment, the vertical edge 230 has a height of 290 cm, the leading edge 220 has a length of 350 cm, and the trailing edge 210 has a length of 158 cm. Of course, other measurements of the edges 210, 220, 230 of the blade 200 to one another are possible without deviating from the inventive concepts described herein. This configuration was arrived at by computer modeling and sub-scale testing. It represents the best functioning prototype thus far. In general, a ratio of the height of the blade 200, i.e, the length of the vertical edge 230, to a width of the blade, i.e., the length of the trailing edge 210 of the blade may be anywhere between 6:1 and 0.5:1. Preferably the height-to-width ratio of the blade 200 is less than 3:1 and more preferably 2:1, although other ratios are possible. Also, as described above, the general shape of the blade is a truncated triangle, with an amount of truncation controlled by the shape of the leading edge 220. Embodiments of the invention may include any degree of truncation. Further, the blade 200 is preferably formed having rounded, rather than sharp, corners, which maximizes airflow over the blade 200 and minimizes drag forces created by the shape of the blade 200.

Figure 3A:
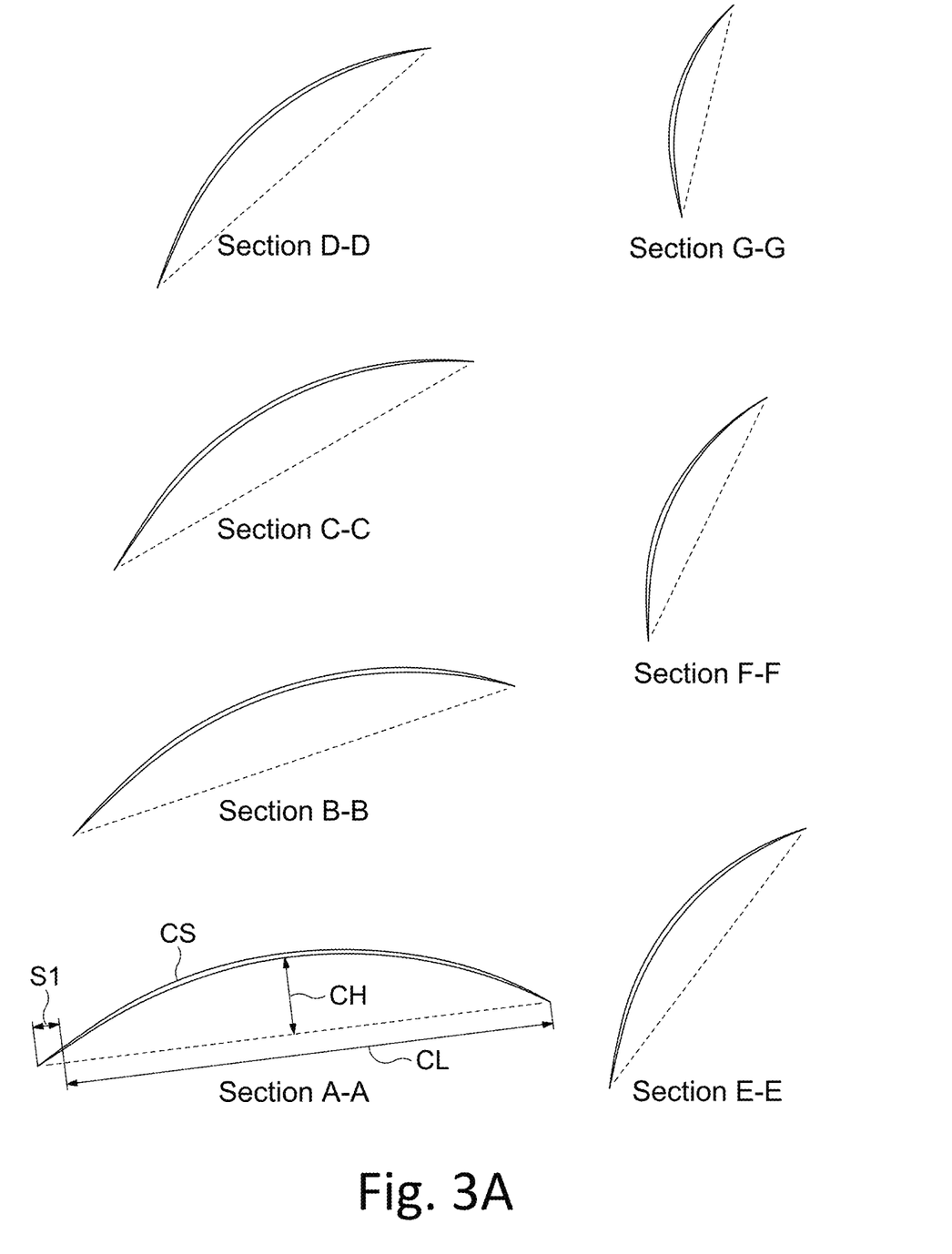
FIG. 3A is an illustration of cross-sectional dimensions of an example wind turbine blade that may be used in conjunction with the dual-rotor wind turbine of FIG. 1, according to embodiments of the disclosure.
Figure 3B:
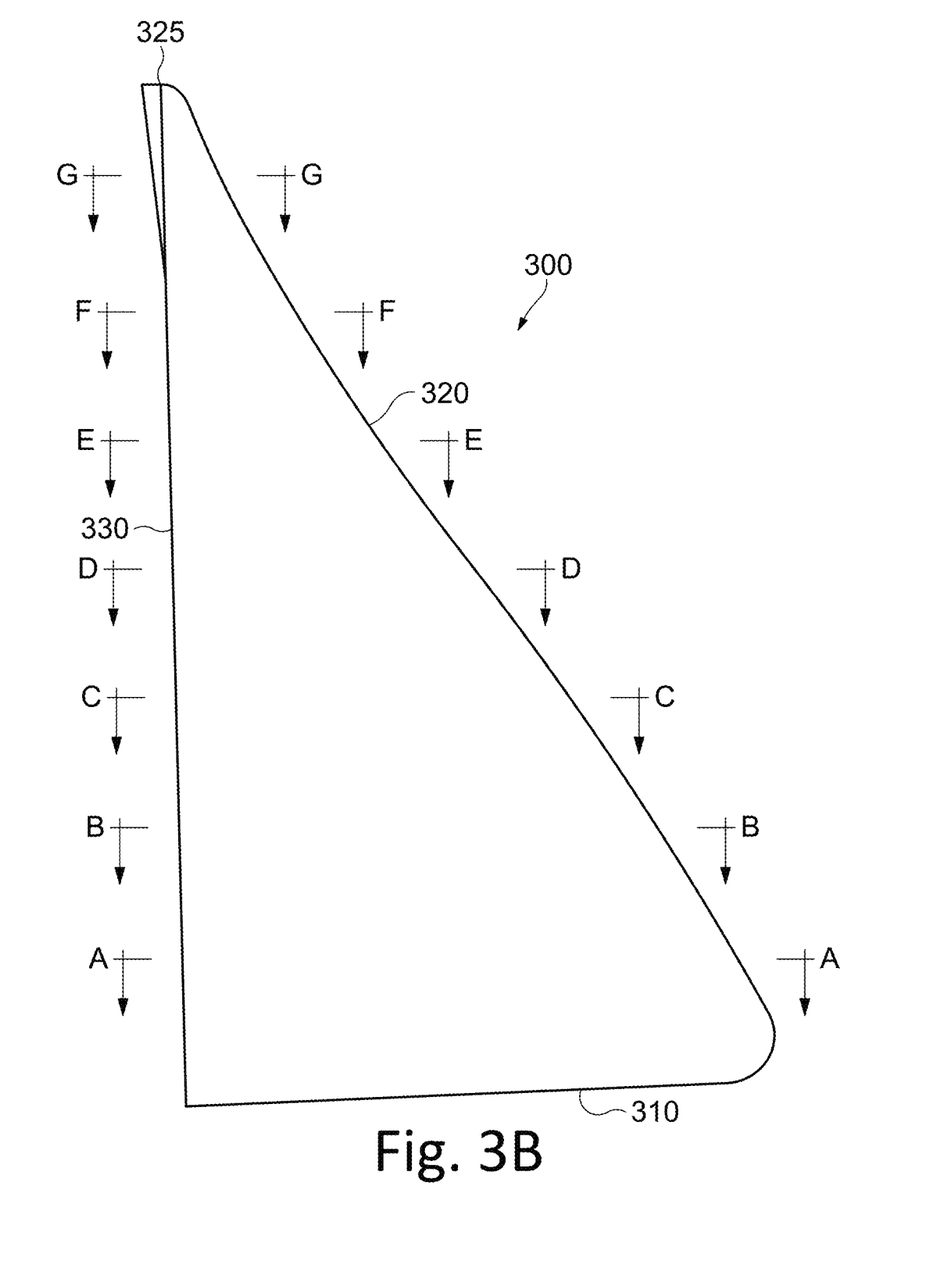
FIG. 3B is an informational diagram of the locations of the cross-sections of FIG. 3A.

FIG. 3A is an illustration of cross-sectional dimensions of an example wind turbine blade 300 that may be used in conjunction with the dual-rotor wind turbine of FIG. 1, according to embodiments of the disclosure. FIG. 3B is an informational diagram of the locations of the cross-sections of FIG. 3A, and also indicates a vertical edge 330, a leading edge 320, and the trailing edge 310. As illustrated in FIGS. 3A and 3B, the length of the curved lines in the various sections of FIG. 3A, such as the line CS illustrated in Section A-A, indicates the cross-sectional lengths of the blade 300 at the various sections. As described above, since the blade 300 is generally in the shape of a truncated triangle, the cross-sectional lengths nearer the trailing edge 310 of the blade are generally longer than the cross-sectional lengths nearer a point 325 where the vertical edge 330 meets the leading edge 320. Using the Section A-A as a reference, the shape of the line cross-section line CS is generally circular, except for a section S1 where the blade 300 is attached to a rotor, described below. In embodiments, the section S1 may make up between 0-20% of the length of the cross-section line CS. A chord length CL illustrates a chord of the generally circular section of the cross-sectional line CS. A chord height CH illustrates the distance of between the cross-section line CS from the chord length CL. The chord height CL may also be referred to as a draft of the blade 300 at the particular point. In general, the ratios of the chord length CL in all of the sections A-A through G-G are the same or similar to the chord heights CH in each of the sections, although the radius of the sections diminishes as the length of the cross-section lines CS reduces. Also, being generally circular, the height CH is at its maximum at the center portion of the cross-section CS, not considering the section S1. In embodiments where S1 has a length of 0, then the height CH is at its maximum at the exact center of the cross-section CS, for each of the Sections A-A through G-G.

Figure 4:
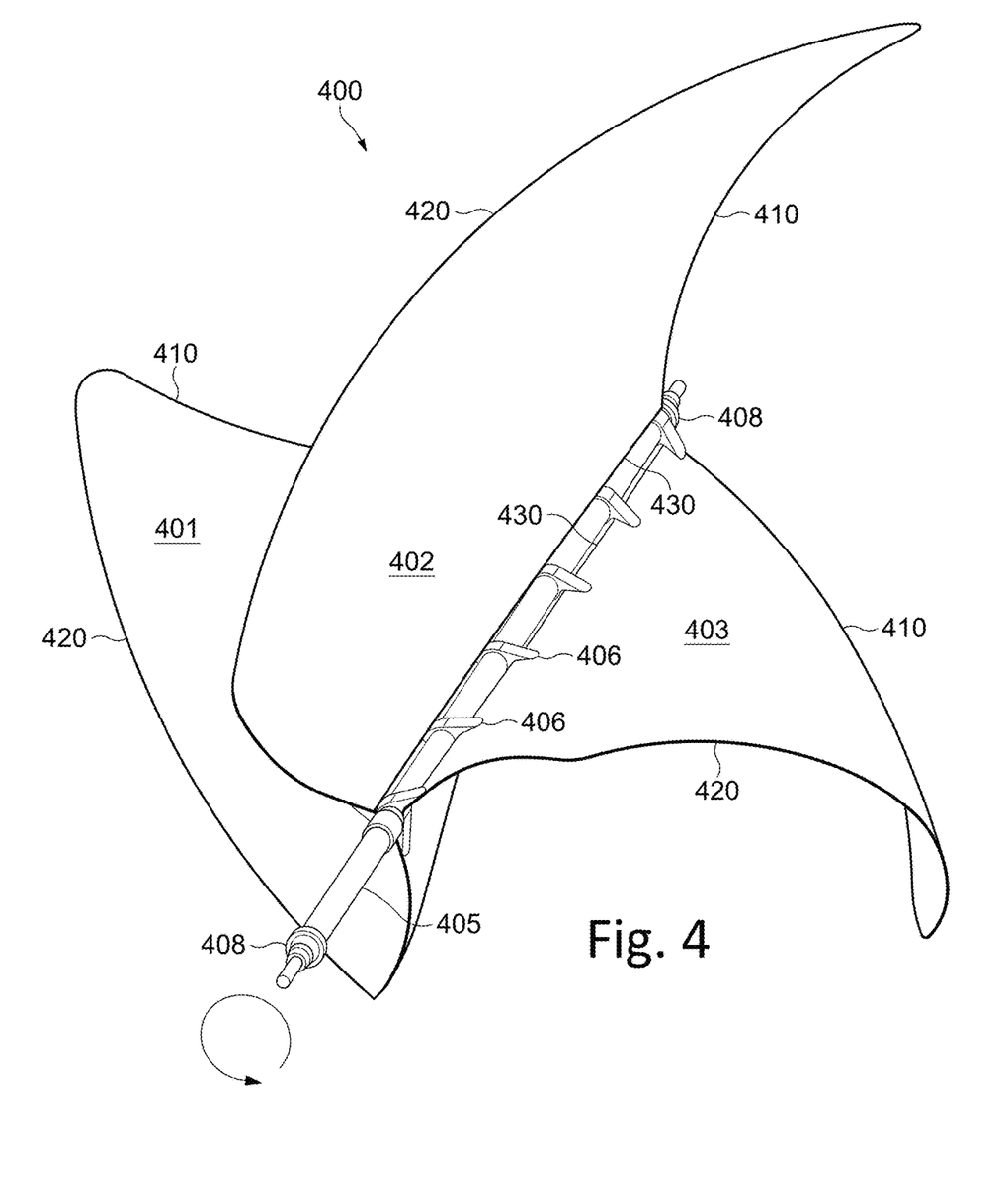
FIG. 4 is a perspective view of a rotor including wind turbine blades coupled to a central axel that may be a component of the wind turbine of FIG. 1, according to embodiments of the disclosure.

FIG. 4 is a perspective view illustrating a rotor 400 including three blades 401, 402, 403 coupled to a central axel 405. The three blades 401, 402, 403 may be examples of the blade 200, 300, of FIGS. 2 and 3, and the axel 405 may be an example of either of the axels 20, 30 of FIG. 1. Each of the three blades 401, 402, 403 includes a trailing edge 410, a leading edge 420, and a vertical edge 430, although the vertical edge of blade 401 is occluded in FIG. 4. Also, compared to FIG. 2, the blades 401, 402, 403 are illustrated in an opposite orientation, with the trailing edge 410 of each blade appearing toward the top of FIG. 4. In general, the three blades 401, 402, 403 are fixedly coupled to the axel 405 through attachments 406. Although illustrated here as a single attachment coupled to all three blades, each blade may be individually attached to the axel 405. FIG. 4 illustrates how each of the attachments 406 is rotationally offset from one another, which sets and maintains the twist of each blade 401, 402, 403 as described above with reference to FIG. 2. In the illustrated example, the blades 401, 402, 403 are set to approximately 90 degrees of twist using six attachments 406. Therefore, each attachment 406 is rotationally offset to one another about the axel 405 by approximately 15 degrees, to achieve the desired 90 degrees of twist for each blade.

The axle 405 is coupled to a frame (see FIG. 1) through a pair of spindles 408, which secure the axel, and therefore the rotor 400, to the frame, but allow the rotor to spin relative to the frame. As described above, the spindles 408 may include bearings or be formed from materials to reduce rotational friction. When the rotor 400 is exposed to wind, the combined lifting forces generated by the blades 401, 402, 403 are imparted to the axel 405. Since the axel 405 is fixed to a frame, but is configured to rotate, the lifting forces are converted to rotational forces on the axel 405, and the rotor 400 spins within the frame in the direction indicated.

It is possible, of course, to arrange the blades 401, 402, 403 in the opposite direction, so that the rotor 400 spins in the opposite direction.

Unlike propeller-style blades of conventional wind turbines, the direction of motion of the rotor 400 is not aligned in the same direction as any of the edges of the blades 401, 402, 403. Instead, as illustrated in FIG. 4, the leading edges 420 and trailing edges 410 of each blade 401, 402, 403 moves perpendicularly or obliquely to the direction of the blade movement. In other words, the rotational motion of the rotor 400 is tangential to or moves across the leading edges 420 and trailing edges 410 of each blade 401, 402, 403 as the rotor spins, rather than along any sharp leading edge as in conventional propeller-style blades. Foreign objects impinging on or striking a blade of the rotor 400 will be struck by a wide, flat, surface of the blade rather than a sharp edge of the blade, making this design safer for both humans and wildlife.

The radial length of the trailing edges 410 of the blades 401, 402, 403 of the rotor 400 is relatively short in comparison to propeller style turbines. This reduced length also reduces the internal centrifugal forces while the rotors are turning. Blade tip velocities of the described rotor 400 are also lower than in propeller-style wind turbines of similar power-generating capacities. This feature, combined with the sail-like shape of the blades 401, 402, 403, reduces overall vibrations and allows for very quiet operation of the wind turbine.

With reference to FIGS. 1 and 4, any number of blades may make up a set of blades attached to the rotor 400. In general, each rotor of a wind turbine 100 includes the same number of blades, and the edges of the individual blades are interleaved with other rotors so that the blades of each rotor spins in concert by overlapping, i.e., without physically interfering with one another. Common numbers of blades in the set of blades of a rotor 400 are 2-20, preferably fewer than five, and more preferably three. As described above, the individual blades in the set of blades attached to the rotor 400 are mounted so as to preserve balance. So, for example, if there are three blades attached to each rotor 400, then each of the blades is offset 120 degrees from one another. Four blades in a set of blades would be offset 90 degrees from one another, and so on.

In some embodiments, the blades 401, 402, 403 of the rotor 400 are made from a substantially rigid material that maintains its shape without external support, such as plastic, fiberglass, or carbon fiber. As used in this context, "substantially rigid" means largely or essentially stiff and not pliant, without requiring perfect inflexibility. In such configurations, the rigidity of the blades 401, 402, 403 of the rotor 400 may help to improve the amount of lift generated by the blades, as the blades are optimized or near-optimized for the prevailing winds of an area in which a wind turbine incorporating the rotor may operate. In other embodiments, the blades 401, 402, 403 of the rotor 400 are flexible, yet strong enough to withstand the forces generated by strong winds. For example, the blades 401, 402, 403 of the rotor 400 may be formed of sailcloth, such as fabric, canvas, Dacron, Kevlar, or other known materials.

Figure 5:
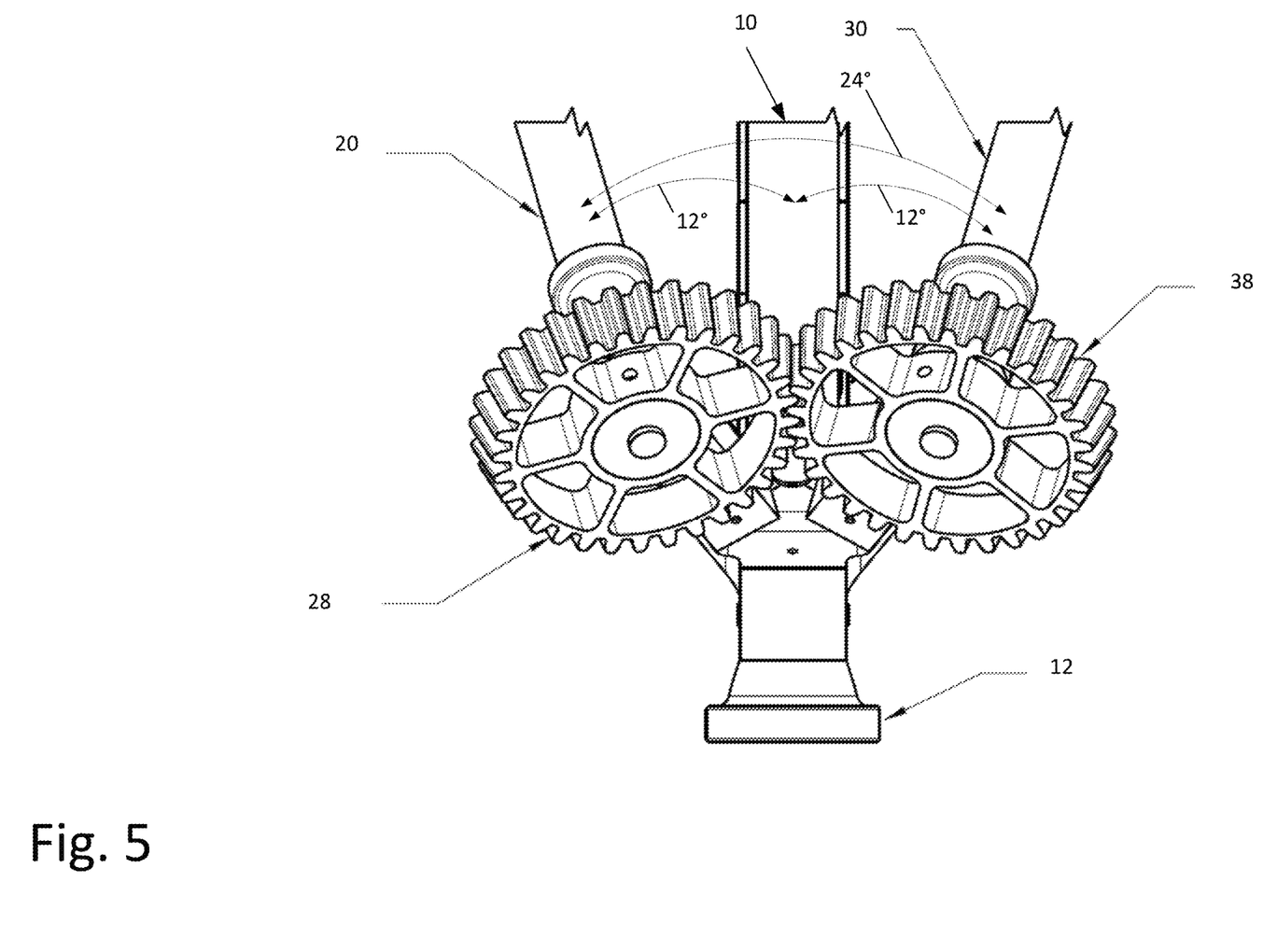
FIG. 5 is a front, isometric line drawing that illustrates a set of bevel gears that may be used in the dual-rotor wind turbine of FIG. 1.

FIG. 5 is a front, isometric line drawing illustrating additional details of the axels 20, 30, and bevel gears 28, 38, that may be used in the dual-rotor wind turbine of FIG. 1. To achieve fully meshed bevel gears 28, 38, the angle of bevel for each gear is selected to be one-half the separation angle between the two axles 20, 30. In the illustrated embodiment, the axels 20, 30 are separated by twenty-four degrees as measured between them, or twelve degrees, each, when measured between a singular axle and a centerline of the frame 10. Other embodiments may have different offset angles between the axels 20, 30. For example, the offset angle may range between 10-90 degrees. Recall from above that the offset angle is also related to the general shape and arrangement of the blades on the rotor 400. If the offset angle is too wide for the overall shape of the rotor 400, a large gap appears between the blades of one rotor and the opposite rotor, or the frame, which is to be avoided for efficient operation of the wind turbine.

Figure 6A:
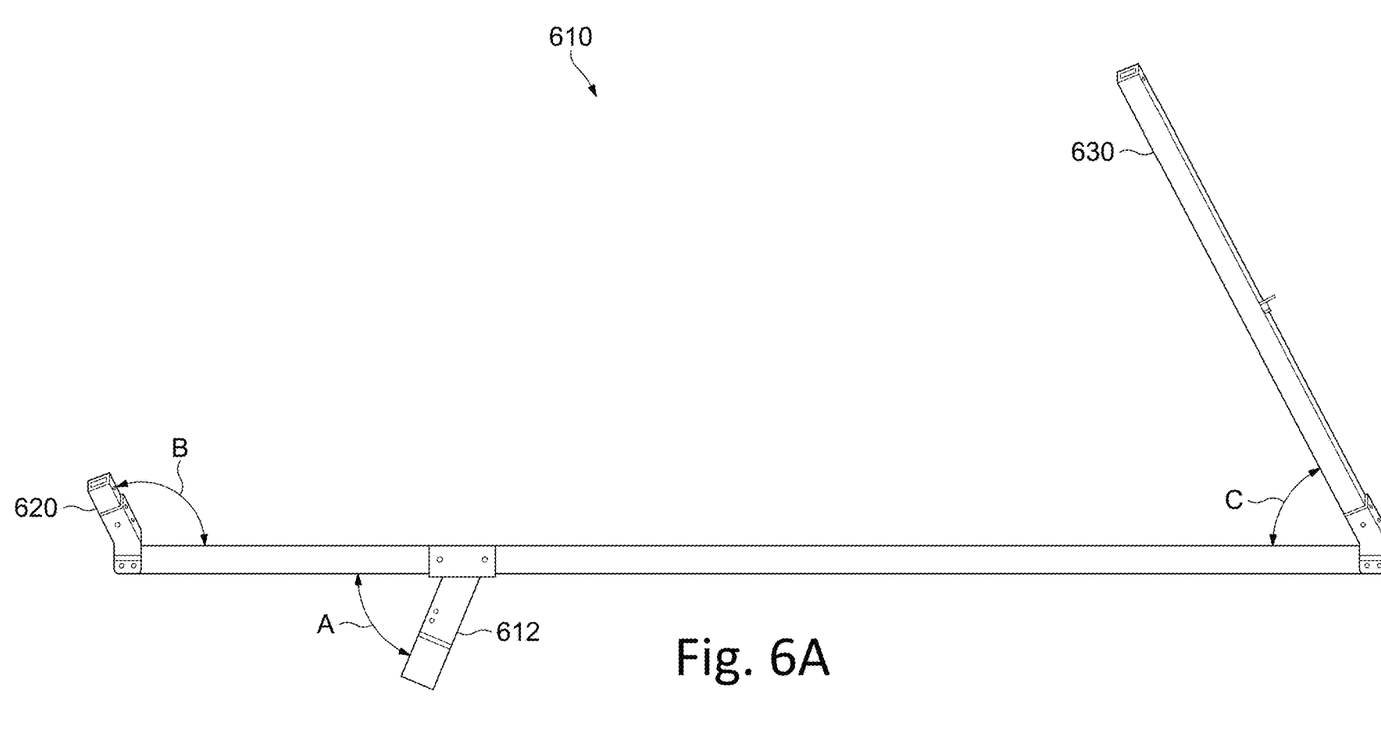
FIG. 6A is a side view of a rotor support frame for a dual-rotor wind turbine according to embodiments of the disclosure in a first orientation.
Figure 6B:
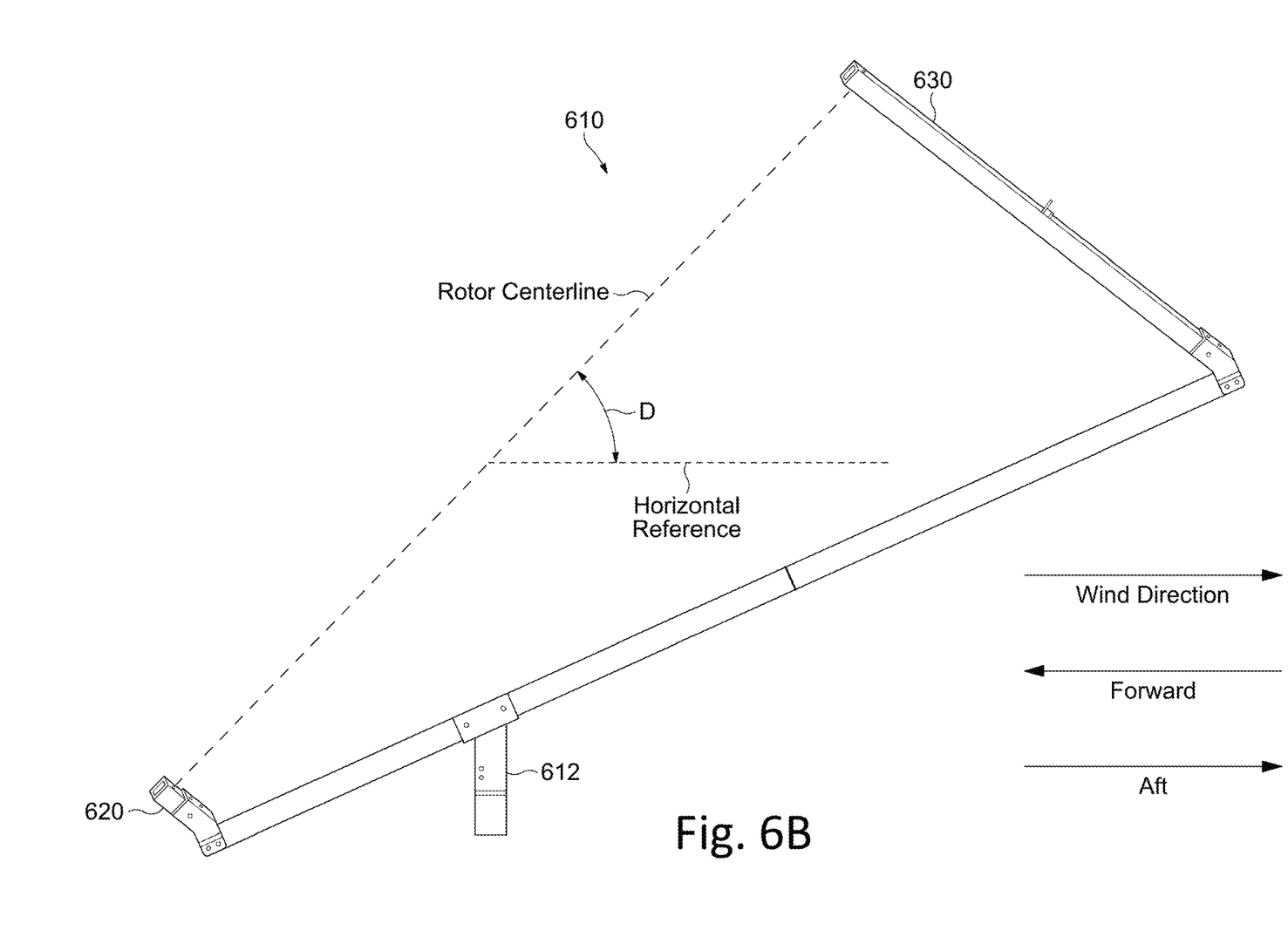
FIG. 6B is a side view of a rotor support frame for a dual-rotor wind turbine according to embodiments of the disclosure in a second orientation.

FIG. 6A is a side view of a rotor support frame 610 for a dual-rotor wind turbine in a first orientation, while 6B illustrates the support frame 610 in a second orientation. The second orientation is the typical operating position for the support frame 610. The support frame 610 may be an example of the frame 10 illustrated in FIG. 1. Like the frame 10, the support frame 610 includes a swivel 612, which allows the entire wind turbine to rotate about its axis as the wind direction changes. As illustrated in FIG. 6B, in its typical operating position, the swivel 612 has a general vertical orientation. In some embodiments, the long axis of the swivel 612 is offset from where it attaches to the frame 610, illustrated in FIG. 6A by the angle A. Angle A may be set to between 20-80 degrees, depending on the implementation and is preferably approximately 66 degrees. The frame 610 also includes a forward support portion 620 and an aft support portion 630. These support portions 620, 630 are attached to opposite ends of a rotor, as described above. The rotors are removed in FIGS. 6A and 6B for clarity. A rotor centerline is illustrated in FIG. 6B, along with an indication of how the wind turbine rotates to face the wind. Forward and aft references are also illustrated. With reference back to FIG. 6A, the forward support portion 620 is offset from the main axis of the frame 610 by Angle B, while the aft support portion 630 is offset from the main axis of the frame 610 by Angle C. Angles B and C are supplementary angles, i.e., they sum to 180 degrees. In some embodiments, Angle B may be set to between 100-140 degrees and preferably 111 degrees. Angle C is set to the supplementary angle of Angle B, and is preferably 69 degrees. With reference to FIG. 6B, in its operation position, the rotor centerline is offset from horizontal approximately 45 degrees, which is illustrated as Angle D. Angle D may be calculated by subtracting 90 from Angle B, and then subtracting this subtotal from Angle A, as illustrated below:

$$\text{Angle } D = (\text{Angle } A - (\text{Angle } B - 90)) \quad \text{Equation (1)}$$

Various angles for Angles A, B, and C may be chosen depending on the implementation. In embodiments, the rotor centerline of the installed wind turbine is approximately 20-75 degrees from horizontal, preferably between approximately 30-60 degrees and most preferably 45 or approximately 45 degrees from horizontal. The word "approximately" in this disclosure means within 10% of the stated value.

Figure 7:
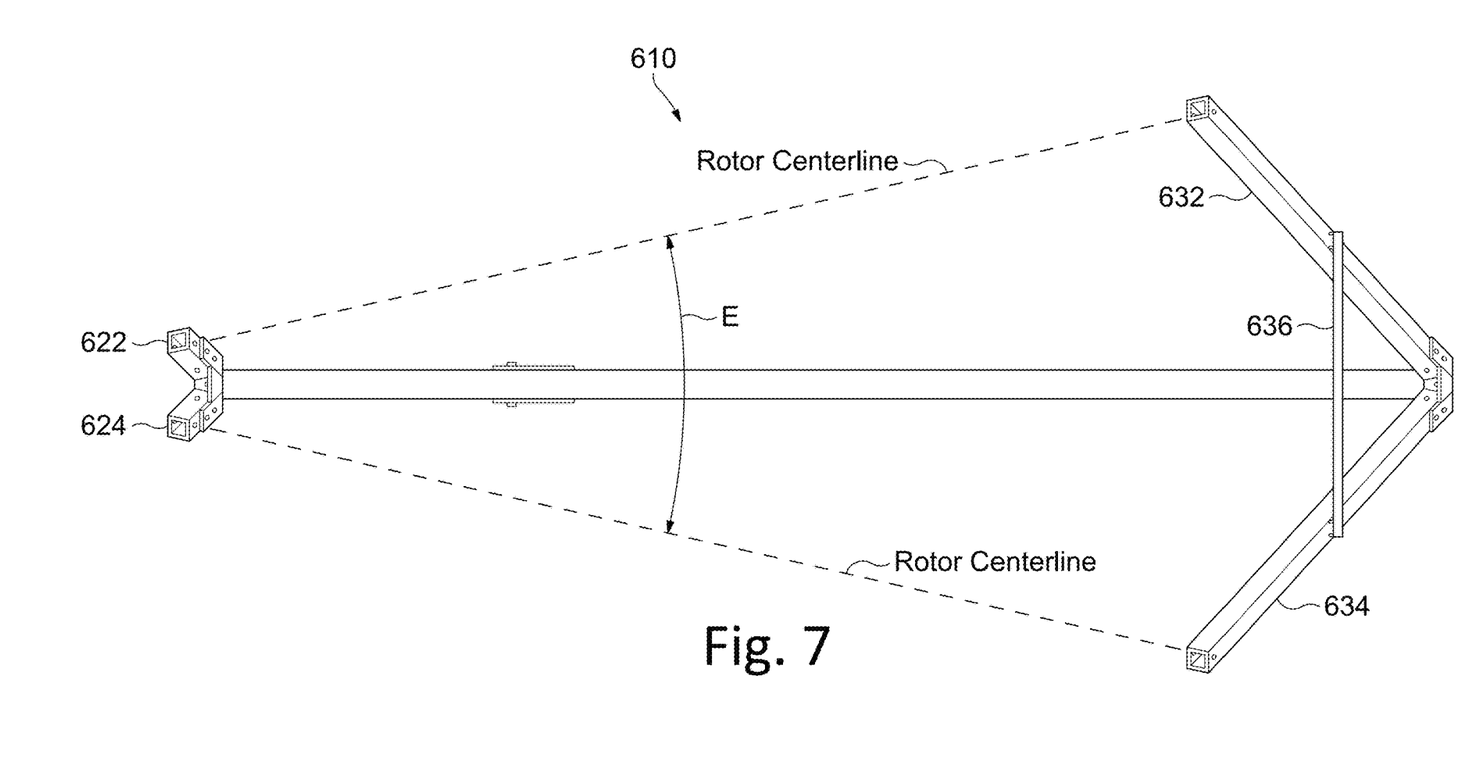
FIG. 7 is a top view of the frame illustrated in FIGS. 6A and 6B illustrating according to embodiments.

FIG. 7 is a top view of the frame 610 according to embodiments. This figure illustrates aft supports 632, 634, which make up the aft support section 630 described with reference to FIG. 6A. A cross member 636 may be used to strengthen the aft supports 632, 634. FIG. 7 also illustrates forward supports 622, 624, which make up the forward support portion 620. Centerlines for the rotors, such as axles 20, 30 of FIG. 1 are also illustrated. The centerlines for the rotors are offset by Angle E, as described above with reference to FIG. 5. This offset angle for the rotors provides sufficient operating space for using sail-shaped blades, which are larger at one end than the other. As illustrated in FIG. 1, when exposed to wind, the smaller portion of the blades faces into the wind, i.e., in the forward direction.

Figure 8:
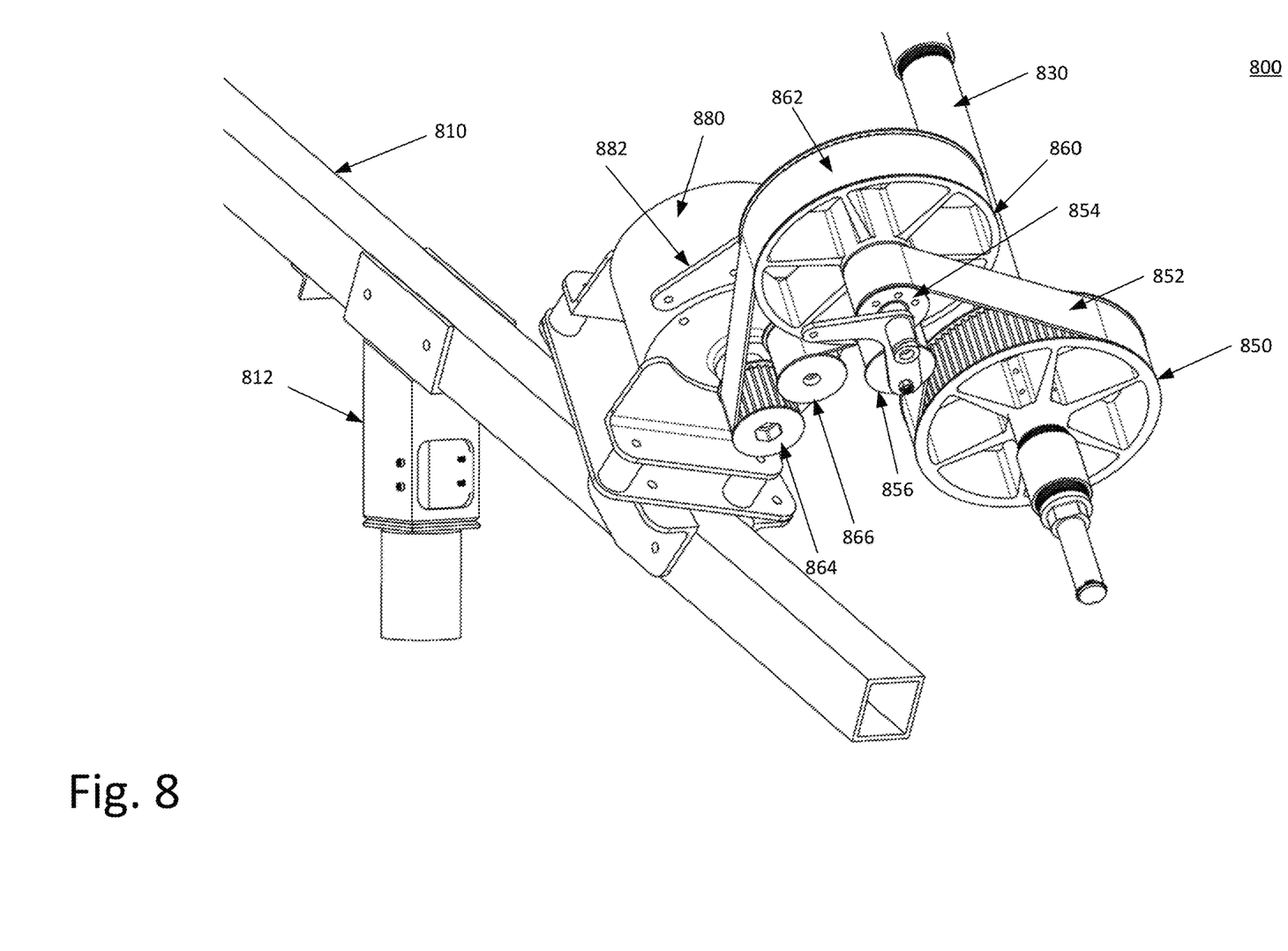
FIG. 8 is an isometric view of a portion of the wind turbine including an electrical generator, according to embodiments of the disclosure.

FIG. 8 is an isometric view of a portion of the wind turbine 800 including an electrical generator 880, according to embodiments of the disclosure. This figure illustrates one of the many ways wind power may be harvested from a wind turbine, such as described above, and turned into useful work or energy. The wind turbine 800 may be the same or similar to the wind turbines described above. The wind turbine 800 includes an axel 830, which may be an embodiment of the axel 30 of FIG. 1. FIG. 8 does not illustrate the forward supports of a frame 810, nor any bevel gears coupled to the axle 830, which are omitted for clarity. A drive pulley 850 is coupled to the axel 830, and rotates in concert, i.e., at the same speed, as the axel 830. As mentioned above, the wind turbine described herein is generally a low-speed turbine, having axel rotation speeds typically less than 400 r.p.m., even in heavy winds up to 50 m.p.h. The electrical generator 880, like most generators, is more efficient when driven faster than 400 r.p.m, so a series of mechanical connections between the drive pulley 850 and generator 880 are used to increase the speed at which the wind turbine 800 drives the generator 880. The generator 880 is aligned in parallel to the axel 830 to minimize loss of power transferred from the axel, and is therefore skewed to the main axis of the frame 810. Swivel 812, similar to the function of swivel 612 described with reference to FIG. 6A, allows the frame 810 to rotate about the swivel 812 as direction of the wind changes.

A first drive belt 852 couples the drive pulley 850 to a driven pulley 854 having a much smaller radius than the drive pulley 850. Thus, the driven pulley 854 spins much faster than the drive pulley 850. In some embodiments a ratio between the drive pulley 850 to the driven pulley 854 is between 2:1 and 4:1, and preferably approximately 2.5:1. An idler pulley 856 maintains tension on the first drive belt 852 while the wind turbine 800 is in operation.

The driven pulley 854 is mechanically coupled to another drive pulley 860, having a much larger radius than the driven pulley 854. The drive pulley 860 may be mounted to a frame 882 affixed to the generator 880, or other component of the wind turbine 800. The driven pulley 854 and the drive pulley 860 spin at the same rate, as they are mechanically coupled. The drive pulley 860 is coupled through a second drive belt 862 to a second driven pulley 864, which is coupled to an armature of the electrical generator 880. A ratio between the drive pulley 860 to the second driven pulley 864 is also between 2:1 and 4:1, and preferably approximately 2.5:1. An idler pulley 866 maintains tension on the second drive belt 862 while the wind turbine 800 is in operation. Recall that, in some embodiments, the driven pulley 854 spins approximately 4 times faster than the axel 830. And, since, in some embodiments, the second driven pulley 864 spins approximately 2.5 times faster than the drive pulley 860, which is coupled to the driven pulley 854, that means the second driven pulley 864 spins approximately 6.25 times faster than the axel 830. Thus, the second driven pulley 864, and therefore the armature of the electrical generator 880 spins between approximately 600-1000 r.p.m. when the wind turbine 800 is exposed to high winds. In one embodiment the drive pulleys 850, 860 each include 90 teeth, and the driven pulleys 854, 864 each include 25, 28, 30, or 36 teeth. These relative sizes of the drive pulleys 850, 860, and driven pulleys 854, 864 produce a total drive ratio of 6.25, 9.00, 10.33, or 12.96 depending on the number of pulleys in the driven pulleys. Those skilled in the art realize the relative, minimum, and maximum sizes of the pulleys described above may be modified based on the actual speeds that the axel 830 experiences and the best operating speeds of the electrical generator 880. Further, the illustrated embodiment is only one way to transmit the power generated by the wind turbine 800 to the electrical generator 880, and other methods are possible, such as using various combinations of gears, pulleys, and devices that couple between them, such as belts and chains.

Figure 9:
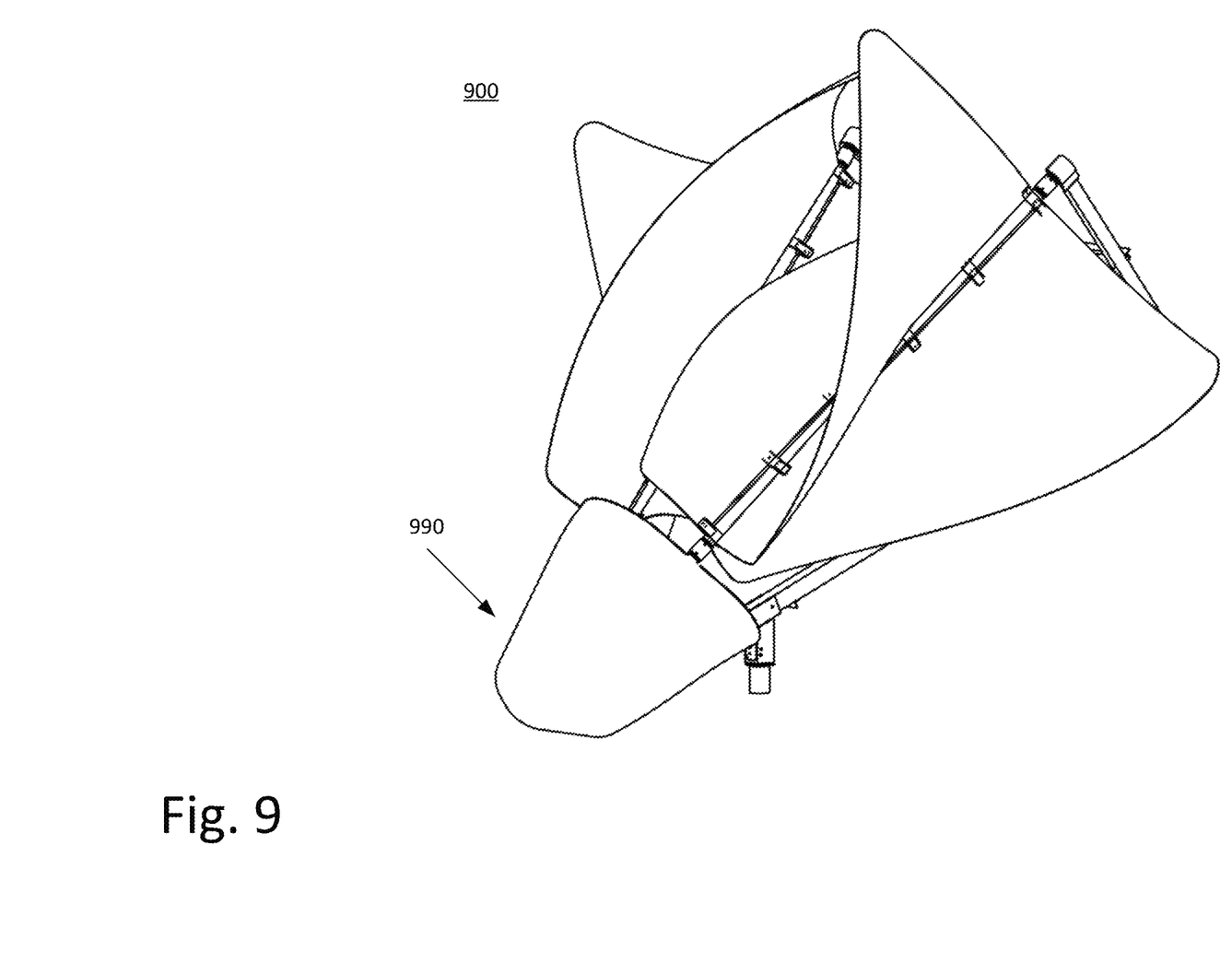
FIG. 9 is a side view that illustrates a position of an optional fairing that may be used with dual-rotor wind turbine of FIG. 1, according to embodiments of the disclosure.

FIG. 9 is a side view of a wind turbine 900 that illustrates a position of an optional fairing 990 that may be used with dual-rotor wind turbine of FIG. 1, according to embodiments of the disclosure. The wind turbine 900 may be an embodiment of any of the wind turbines described above. The fairing 990 may be formed of any durable material, such as plastic, fiberglass, or metal, etc., and generally covers forward components of the wind turbine 900, such as beveled gears and other components illustrated above. The fairing 990 also protects such components from sun, rain, snow, and other factors that may negatively affect performance of the wind turbine 900 as it is exposed to the elements. The fairing 990 may be shaped differently than that illustrated in FIG. 9, in that it could be wider, shorter, and/or have a different general shape than the illustrated embodiment.

Figure 10:
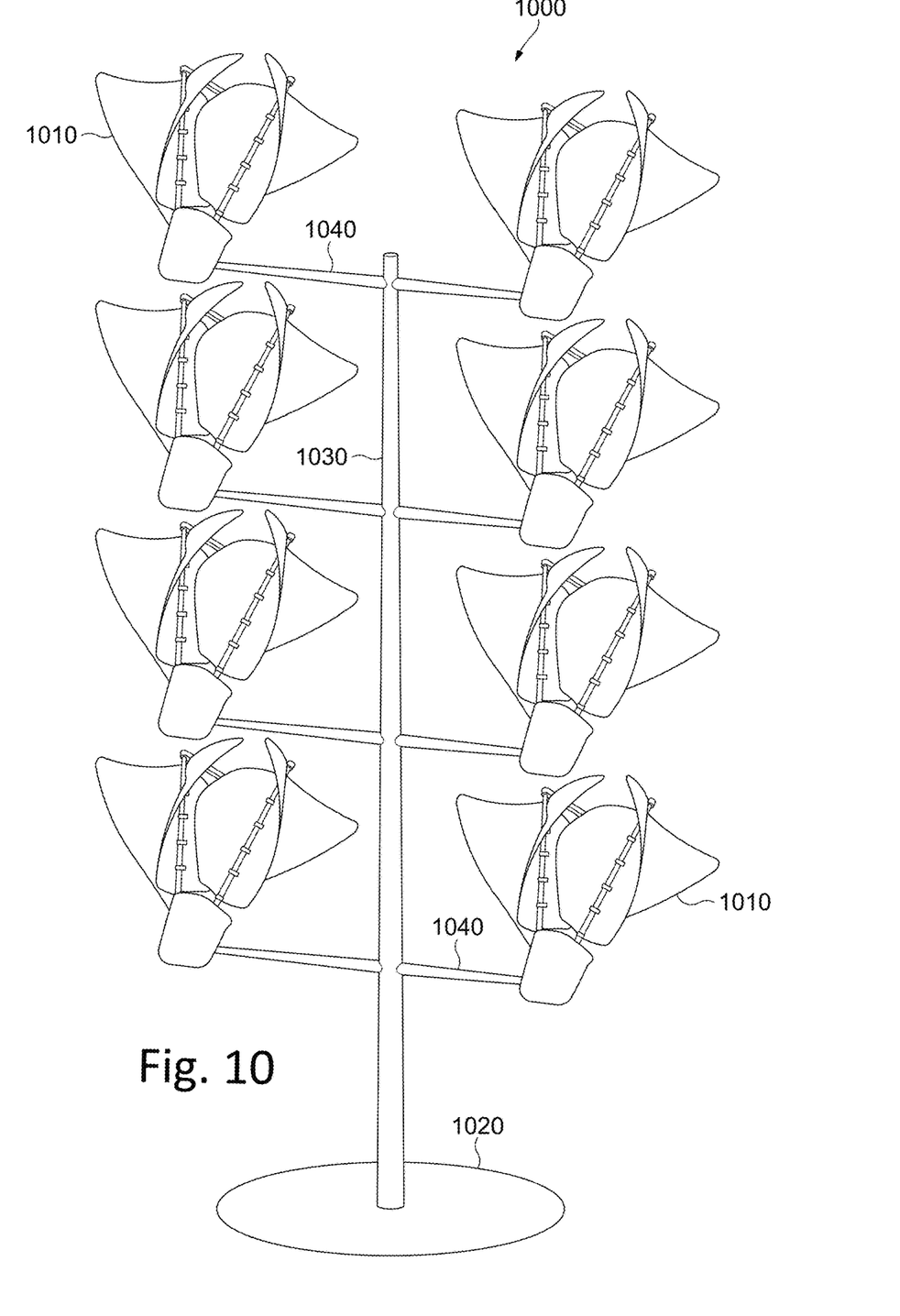
FIG. 10 is a front view illustrating that a collection of dual-rotor wind turbines may be used together, according to embodiments of the disclosure.

FIG. 10 is a front view illustrating a wind generator 1000 having a collection of dual-rotor wind turbines 1010 being cooperatively used together, according to embodiments of the disclosure. The wind turbines 1010 may be an example of any of the wind turbines described above. In general, a tower for supporting the turbines 1010 may include a base 1020, a vertical member 1030, and multiple horizontal members 1040 which attach to the vertical member. The vertical member 1030 may or may not pivot, or rotate, relative to the base 1020. Also, each turbine 1010 may individually pivot about its attachment to the horizontal member 1040, or each turbine 1010 may be fixed to its horizontal member. The base may vary from the base 1020 illustrated in FIG. 10. For example, the base may be permanently mounted to the ground, or a building, or other structure. Also, although eight wind turbines 1010 are illustrated in FIG. 10, any number of turbines may be present in the wind generator 1000. Typically, each wind turbine would include its own generator, such as that described with reference to FIG. 8. Electrical wires stemming from each generator would couple to a combining device, not illustrated, so that the electrical output of the individual wind turbines 1010 of the wind generator 1000 is combined to a single output. With sufficient scaling, the wind generator 1000 could be mounted on existing towers of wind-generating devices to replace such devices.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "underneath," "right," and "left" are used for convenience and in reference to the views provided in figures. But the safety container may have a number of orientations in actual use. Thus, a feature that is vertical, horizontal, underneath, to the right, or to the left in the figures may not have that same orientation or direction in actual use.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific example configurations have been described for purposes of illustration, it will be understood that various modifications may be made without departing from the spirit and scope of the disclosure.

I claim:

1. A wind turbine, comprising:
   a frame having an elongated shape and being configured to be mounted on a horizontal surface, the frame including:
      a central frame member extending from a first end of the frame to a second end of the frame,
      a pair of lower rotor supports proximate the first end of the frame, wherein each lower rotor support of the pair of lower rotor supports is disposed a first distance from the central frame member, and
      a pair of upper rotor supports proximate the second end of the frame, wherein each upper rotor support of the pair of upper rotor supports is disposed a second distance from the central frame member, the second distance different than the first distance;
   a first rotor rotatably mounted both to a first of the pair of lower rotor supports and to a first of the pair of upper rotor supports;
   a second rotor rotatably mounted both to a second of the pair of lower rotor supports and to a second of the pair of upper rotor supports, wherein, when so mounted, a centerline of the first rotor and a centerline of the second rotor have an angle relative to the horizontal surface between 30 and 60 degrees;
   a first bevel gear coupled to the first rotor and a second bevel gear coupled to the second rotor, the first and second bevel gears structured to intermesh with one another when the first rotor and the second rotor are mounted to the pair of lower rotor supports;
   one or more first blades coupled to the first rotor, the one or more first blades each having a degree of twist in a first direction, the one or more first blades each having a first end and a second end, wherein a cross-sectional length of each of the one or more first blades at the first end thereof has a shorter length than a cross-sectional length of the one or more first blades at the second end thereof; and
   one or more second blades coupled to the second rotor, the one or more second blades each having a degree of twist in a second direction opposite the first direction, the one or more second blades each having a first end and a second end, wherein a cross-sectional length of each of the one or more second blades at the first end thereof has a shorter length than a cross-sectional length of the one or more second blades at the second end thereof.

2. The wind turbine according to claim 1, wherein the first rotor and the second rotor are offset from one another between 10 and 90 degrees.

3. The wind turbine according to claim 1, further comprising a swivel mounted between the frame and a fixed mount, wherein the swivel allows the frame to rotate about the fixed mount, the fixed mount for mounting the wind turbine on the horizontal surface, and wherein the wind turbine does not include a wind rudder.

4. The wind turbine according to claim 1, wherein the one or more first blades of the first rotor each has a truncated-triangle shape.

5. The wind turbine according to claim 1, wherein a cross-section of each of the one or more first blades and a cross-section of each of the one or more second blades are curved.

6. The wind turbine according to claim 1, wherein a cross-section of each of the one or more first blades and a cross-section of each of the one or more second blades include straight portion and a curved portion.

7. The wind turbine according to claim 1, further comprising a fairing.

8. The wind turbine according to claim 1, further comprising a generator coupled to one of the first rotor or the second rotor.

\* \* \* \* \*